C. KENNE, Jr., H. KENNE, A. KENNE, T. CARMODY & T. A. SWANSON.
GRAIN SHOCKING MACHINE.
APPLICATION FILED JULY 16, 1909.

985,529.

Patented Feb. 28, 1911.

UNITED STATES PATENT OFFICE.

CASPER KENNE, JR., HENRY KENNE, ANTHONY KENNE, THOMAS CARMODY, AND THEODORE A. SWANSON, OF WHITTEMORE, IOWA.

GRAIN-SHOCKING MACHINE.

985,529.     Specification of Letters Patent.     Patented Feb. 28, 1911.

Application filed July 16, 1909. Serial No. 508,023.

*To all whom it may concern:*

Be it known that we, CASPER KENNE, Jr., HENRY KENNE, ANTHONY KENNE, THOMAS CARMODY, and THEODORE A. SWANSON, citizens of the United States, residing at Whittemore, in the county of Kossuth and State of Iowa, have invented certain new and useful Improvements in Grain-Shocking Machines, of which the following is a specification.

This invention relates to grain-shocking machines, and has for its particular object the provision of an improved machine, which, in its preferred embodiment, is designed to receive bundles of grain suitably bound beforehand in a binder, to the side of which this machine is fastened, and assemble them to form a shock, each shock containing the same number of bundles and the bundles being so arranged as to tilt inwardly toward the center of the shock.

In the general form of the invention there are provided a plurality of arms having grasping devices which pick up bundles consecutively, and after all the arms have received a bundle, the machine is automatically brought into such position that the bundles are deposited simultaneously to form a shock, over which the arms are released from the bundles, and several of the arms, which are in the direct line of the shock, are raised out of the way automatically, so that, the entire machine being clear of the shock, it can move on to repeat said operation.

This invention will now be described in detail, by reference to the accompanying drawings, in which—

Figure 2:
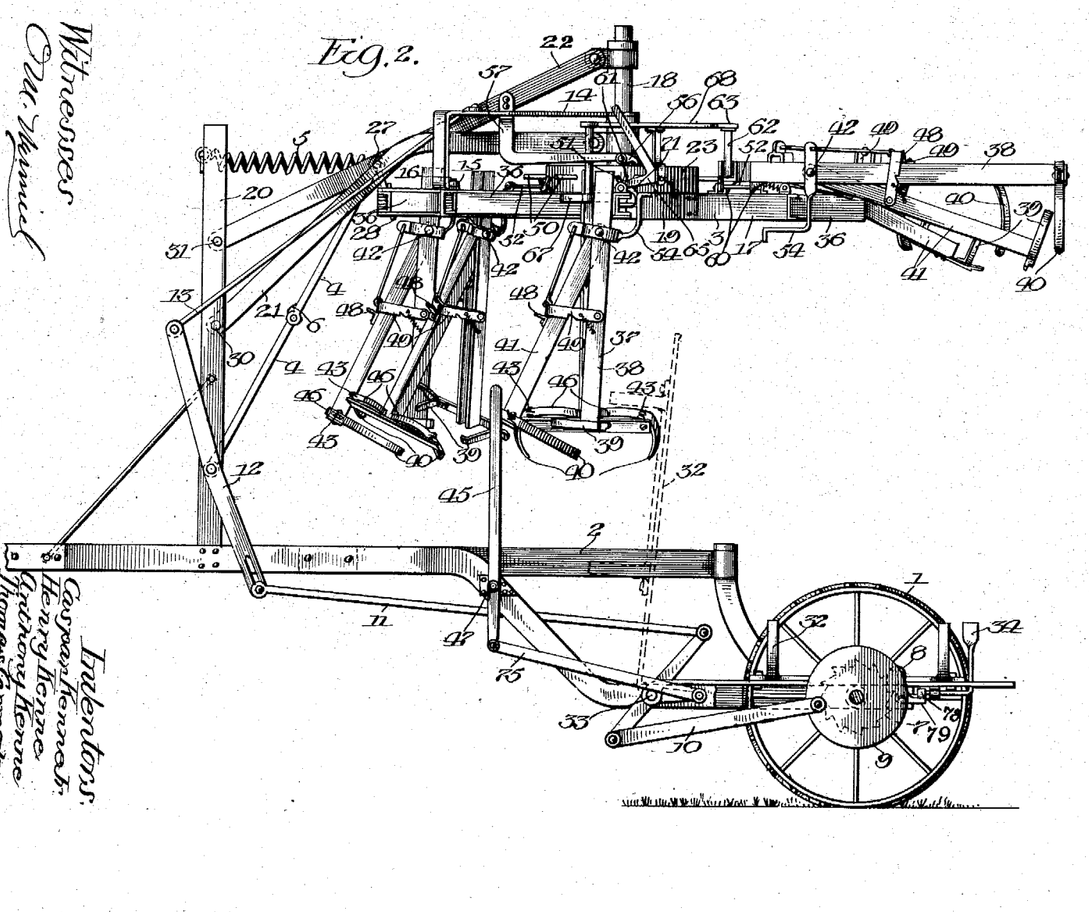
Fig. 2 shows the machine with all the arms released and having passed beyond the shock without interfering with the same.

Referring more particularly to Fig. 2, the machine is mounted on traction wheels 1, 1, which support a framework 2, the front end of which framework may be suitably supported as hereinafter described.

The general plan of operation for the machine is for each one of the arms to receive a bundle, and when they have all been supplied with bundles, the entire framework 3, which will be explained in detail hereinafter, is lowered by bending out of alinement the pivoted arms 4, 4, thus permitting the framework 3 to be lowered to deposit the bundles, and when the bundles have been deposited by means of automatic mechanism to be explained hereafter, the arms are released from said bundles, and the framework 3, being thus relieved from the weight of said bundles, the spring 5 again draws the framework 3 into the position shown in Fig. 2, in which position the arms 4 lock by means of the lip 6, until the arms are again filled, when one of the arms again breaks the position of the arms 4, 4, and allows them to rotate, thus redepositing another shock.

To perform all of the operations, one of the traction wheels is provided with a toothed wheel 7, which is adapted to be engaged by a pawl 8, which pawl, when engaging the wheel 7, rotates a crank wheel 9, which crank-wheel imparts the motion to the link 10, which, by means of the connecting rod 11 and pivoted lever 12, and a further connecting rod 13, actuates a rotatably mounted arm 14, provided with a pawl 15, which pawl engages pins 16, mounted upon radial arms 17.

Figure 1:
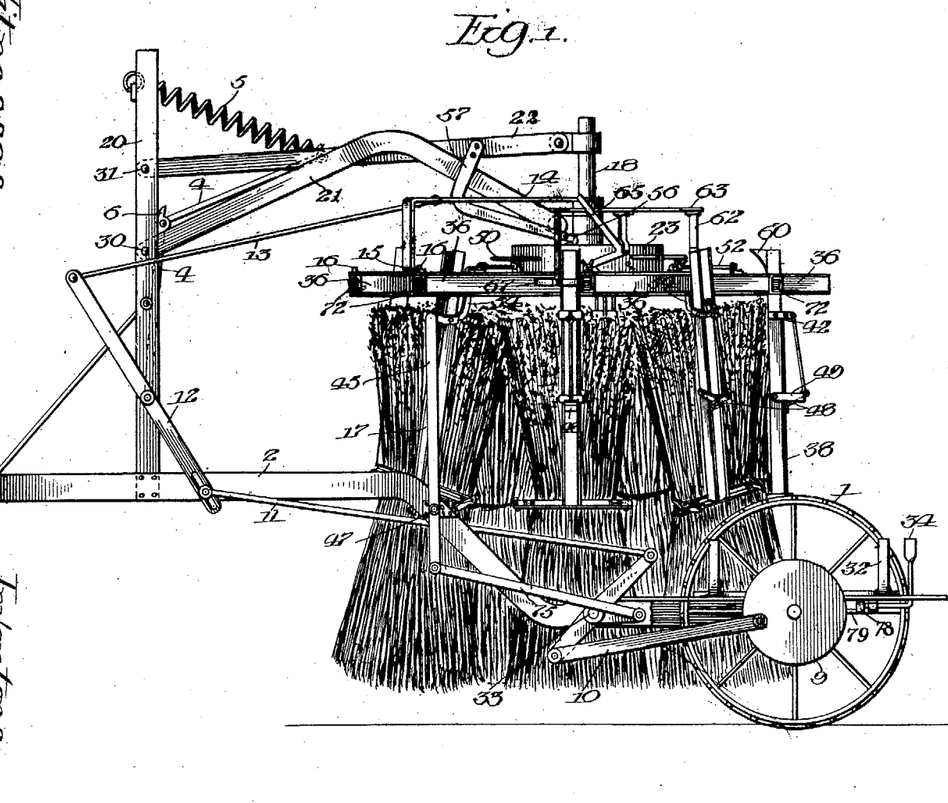
Figure 1 is a side view of the machine in the act of depositing the bundles to form a shock.

It will be seen that the movement of this apparatus so far described causes, by means of the rotation of one of the wheels 1, an oscillatory movement of the arm 14, which, by means of its pawl 15, consecutively embraces the arms 17 at the pins 16, and draws said arms 17 in a rotary direction about a central shaft 18. The arms 17 are all mounted upon a disk 19, which disk is rotatably mounted on the shaft 18, and which disk 19 thereby receives, due to the action of the arm 14, a periodic rotary motion about said shaft 18, whenever the wheel is rotating and the pawl 8 is in engagement. The shaft 18 is held by a framework mounted upon the horizontal member 2, which framework consists of the upright members 20, upon which uprights 20 are mounted the outwardly extending arms 21 and 22, which support said shaft. An upper disk 23 is likewise rotatably mounted about the shaft 18, but has a limited motion, which limited motion is imparted to it in a manner to be described hereinafter, and which disk 23 is joined to the disk 19 by means of a spring 24 and a pin 25, mounted upon the disk 19, and the pin 26 mounted upon the disk 23. It will be seen, therefore, that the spring 24 maintains the disk 23 in normal position. The arms 21 and 22 are held in their normal position, as shown in Fig. 2, by means of the two links 4, 4, which are hinged, as shown in said figure, and which said links are provided with lip 6, which when the arms are in the position shown, maintain them in this position. The upper link 4 is fastened to a shaft 27, integral with which is mounted the crank arm 28, which arm is at times operated by one of the arms 17, by means of the projection 29 thereon, which projection engages the arm 28 by pressing the lower extremity of said arm 28 downwardly, thus to bend the links 4, as shown in Fig. 1, at their pivotal point in a leftward direction, thus permitting, when there is sufficient weight carried by the arm 17, to permit said disks and arms to move downwardly about the pivots 30 and 31, being held only in position by the spring 5. The operation of the machine is then such that when the weight of the grain is released from the arms, the spring 5 draws the entire operating mechanism again into the position shown in Fig. 2, so that the links 4, 4, by means of the lip 6, form a substantial and continuous support, until they are again forced out of alinement upon a recurring operation of the machine. The machine is further provided, as shown more clearly in Fig. 4, with a support for bundles of grain, comprising the cradle 32, which cradle is rigidly mounted upon the shaft 33. Now, whenever a bundle is deposited from the binder to the cradle, it strikes the pivoted lever 34, which has mounted upon its end the detent 78, at which time said detent is raised from the tail-piece 79, of the pawl 8, and said pawl allowed to engage the ratchet wheel 7, and the machine begins to operate through the agency of the links 10 and 12 aforesaid. At the same time, the cradle 32 is raised by the rotation of the shaft 33 into a substantially vertical position, as shown in dotted lines in Fig. 2, and holds the bundle of grain in practically vertical position, where it can be engaged by the arms 17, as will be now described.

Each arm 17 consists of the radial support 35, to which is pivotally secured an arm 36, from which depends the carrier 37. Each of the carriers 37, which are mounted upon the arms 36, consists, as more particularly shown in Figs. 8 and 9, of a downwardly extending channel-shaped member 38, which, at its lower end, carries arms 39, whose purpose will be more fully explained hereinafter.

Figures 5, 6, 7:
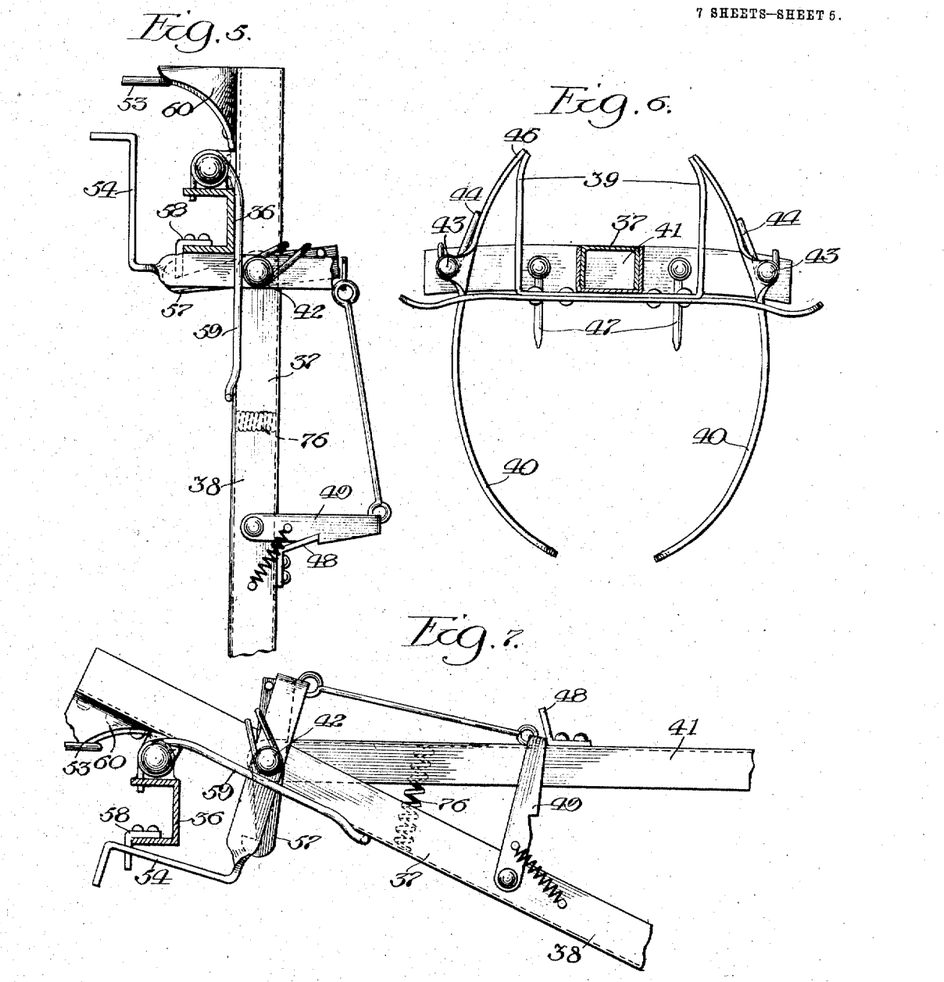
Figs. 5, 6, 7, 8 and 9 are details of the arms and grasping devices.

The grasping device, consisting of the arms 40, is mounted upon a pivotal lever 41, hinged to the channel 38 at 42, which arms 40 are pivotally mounted upon the lever 41 at 43, as shown in Fig. 6. Springs 44 maintain the arms 40 in an outward position, as shown in the plan view of Fig. 3.

Now, when by means of the lever 45, whose operation will presently be explained, the arm 41 is pressed inwardly toward the channel 38, the arms 39 engage the forward extensions 46 of the arms 40, and press the rearward extensions outwardly, as shown in Fig. 6, at which time the arms 40 engage a bundle of grain, at which time the pins 47 enter the bundle to more thoroughly hold it in position, said pins 47 being firmly mounted on the arm 41. When the arm 41 is pressed tightly against the channel 38, a catch 48 engages a notch provided in the pivoted arm 49, and locks the entire carrier in its carrying position. The operation of the lever 45 to accomplish this is more clearly shown in Fig. 9, and also the position of the various parts when they are locked in position.

Figure 10:
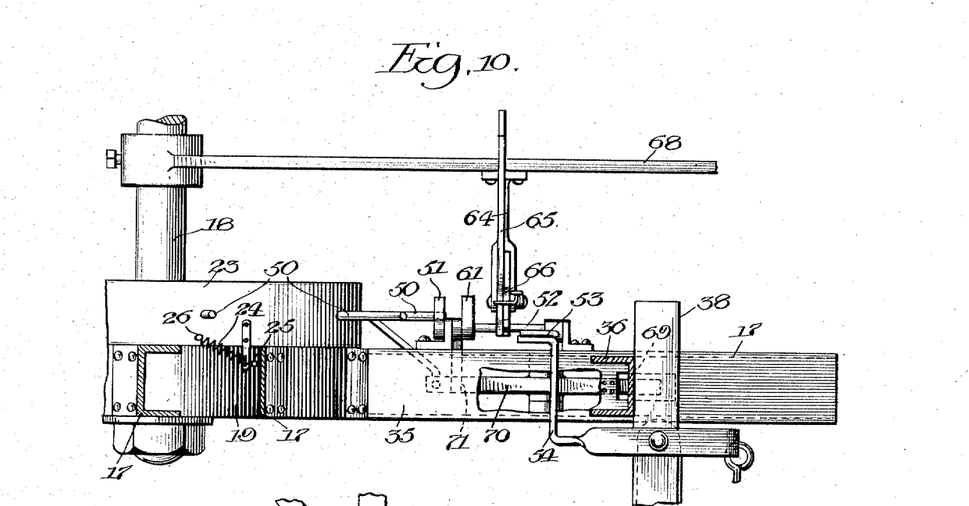
Fig. 10 is a detail view of the mounting mechanism for the arms and the automatic devices associated therewith.

Now when all the carriers have received their bundles and it is desired to deposit the same to form a shock, pins 50, upon the disk 23, engage an arm 51, as shown in Fig. 10, which, by operating a shaft 52 pivoted upon the radial arm 35, through the agency of the crank 53, presses against the lever 54, thereby raising the arm 49 to release the catch and permit the carriers to deposit the bundles in a position as shown in Fig. 1.

The operation of the disk 23 is brought about by a catch 55, which is fastened to said disk 23, and which, when the machine is in its depositing position, has moved around to a position where it can be engaged by a pawl 56, as shown in Fig. 2, mounted upon an arm 57. The operation is such that as the shaft 18 moves downwardly, the pawl 56 is somewhat restrained on account of the parallel motion of said shaft 18, and thereby exerts a pressure against the catch 55 to cause a slight rotation in a clockwise direction of the disk 23, thereupon allowing its pins 50 to perform the work before outlined.

When the bundles are in the position shown in Fig. 1, and the arms are released, it will be apparent that for the machine to move on it is necessary for two of the arms to be raised, as shown in Fig. 2, so that they can pass on without interfering with the deposited shock. To perform the function of raising the carriers 37, the arm 54 is pressed downwardly and releases a lever 57 from engagement with a catch 58, which thereby permits said carrier 37, by virtue of the strong spring 59, to be elevated as shown more clearly in Fig. 7.

When the machine is operated and it is desired to lower the two carriers 37, means are provided consisting of a cam 60, provided upon the upper end of the carrier 37, which cam 60 is engaged by the crank 53, when said crank 53 is elevated, due to the operation of the shaft 52, when the arm 61, mounted upon said shaft 52, is engaged by downwardly extending arm 62 mounted upon a radial arm 63. The carriers 37, as they pass the radial arm 63 are thereby again lowered to their normal position, and caught in place by engaging the catch 58.

Figures 11, 12:
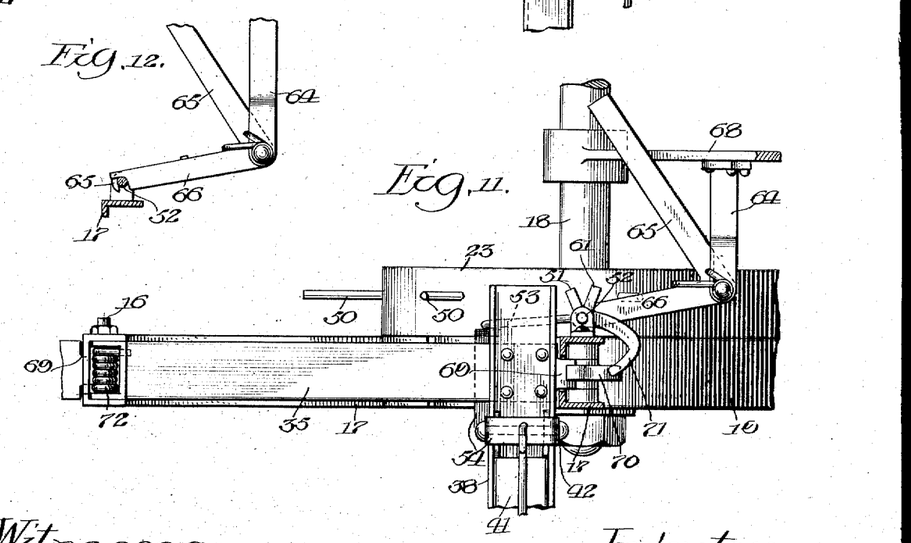
Fig. 11 is a detail end view of the mechanism shown in Fig. 10.
Fig. 12 is a further detail view of the carriage detaining device.

When the arm 14 in its oscillation grasps the pins 16, it is essential that the dog 15 properly engages said pins, and to this end, as shown in Figs. 11 and 12, a bracket 64 is provided, upon which is pivoted a bell-crank-lever 65, which has a pawl 66, which normally engages the shaft 52, but which is released from its engagement with said shaft when the bell-crank-lever is engaged by the arm 14 in its forward movement.

Figure 4:
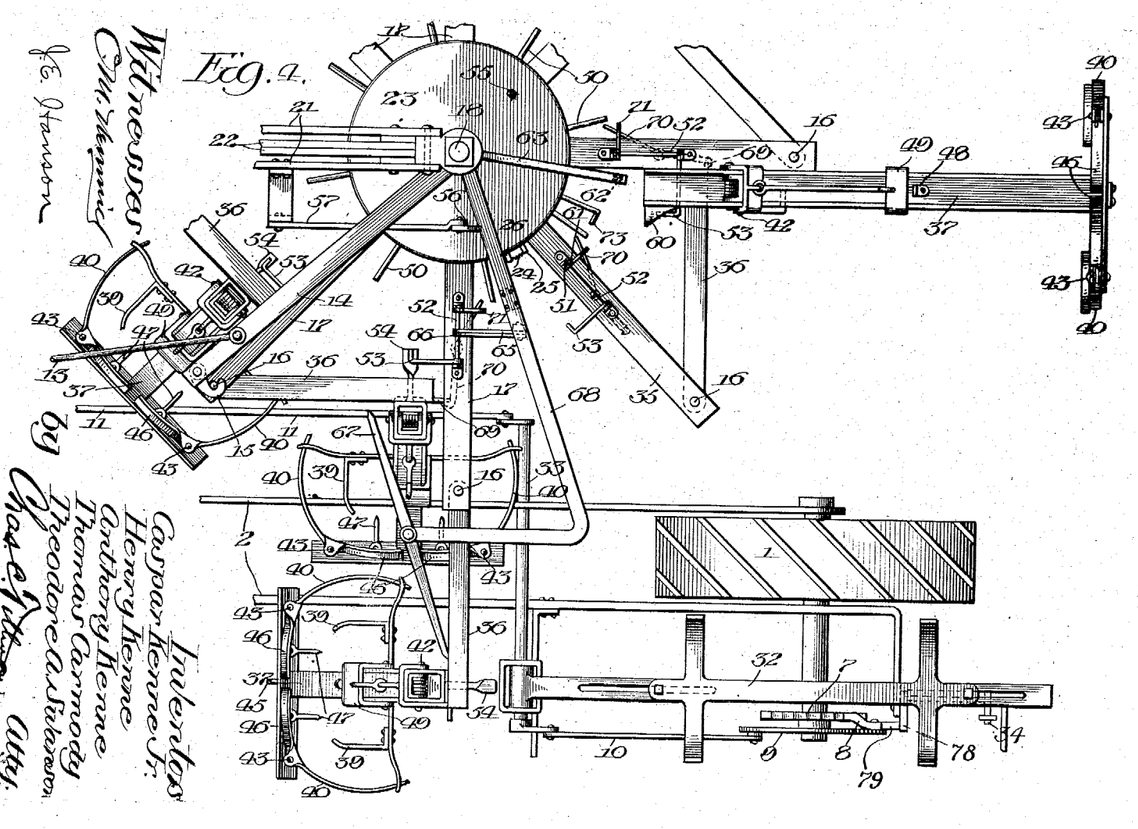
Fig. 4 is an enlarged plan view, showing the various features more in detail and portions being broken away.

When the bundle of grain is originally deposited in the cradle 32, the cradle 32 is moved into a vertical position, and the bundle grasped by the carrier 37, and thereafter, by referring to Fig. 4, the arm 14 grasps the pin 16, and begins to rotate the arm 17, including the whole carriage, in clockwise direction, thereby permitting the pivotal arm 67, which is mounted upon an arm 68, to press against the arm 36, and as the rotation of the framework takes place, to press the arm 36 inwardly by engaging first one and then the other of its extremities, to the position shown as occupied by the two left-hand carriers in Fig. 4. It will thus be seen that after a bundle has been grasped, the carriers are bent inwardly into a position which they must occupy when depositing the bundles to form a shock. When the arm 67 thus presses the arm 36 inwardly, a projection 69 on said arm is engaged by a catch 70, and thus said arms are held in position. After all of the bundles have been deposited and the arms have been released, each operation of the machine permits the arm 62 to engage the dog 61, which thereby operates the trigger 71, which presses against the pivotal member 70, which thereby releases the arm 36, and permits it, by virtue of the spring 72, to swing outwardly into the position to receive a bundle from the binder as shown in Fig. 4. A further operating pin 73 is provided, which engages the lever 70, mounted upon the arm 35, whose object is to release the first carrier that is to be thrown in an outwardly position, and its purpose is to bear against said catch 70 before the machine has begun its operation, so that the carrier may be in position to receive the bundle, as said arm 35 has, by the time the bundles are deposited, already passed the arm 62, and can no longer be actuated by that arm to cause it to swing into its outward position.

It will be evident by reference to the drawings that when the machine is in the position shown in Fig. 1, the dog 56, is in engagement with the lug 55, which is fastened integrally with the disk 23, and as the frame-work 3, is lowered, said disk will receive a slight rotary motion, in a clock-wise direction, thereby bringing the pins 50, into engagement with the dogs 51 and cause the carrier arms 37, to release the bundles, at about which time the pin 73, will have reached the catch 70, and also release the arm 36, in time to be in position to receive the first bundle from the binder to form the second shock.

Figure 9:
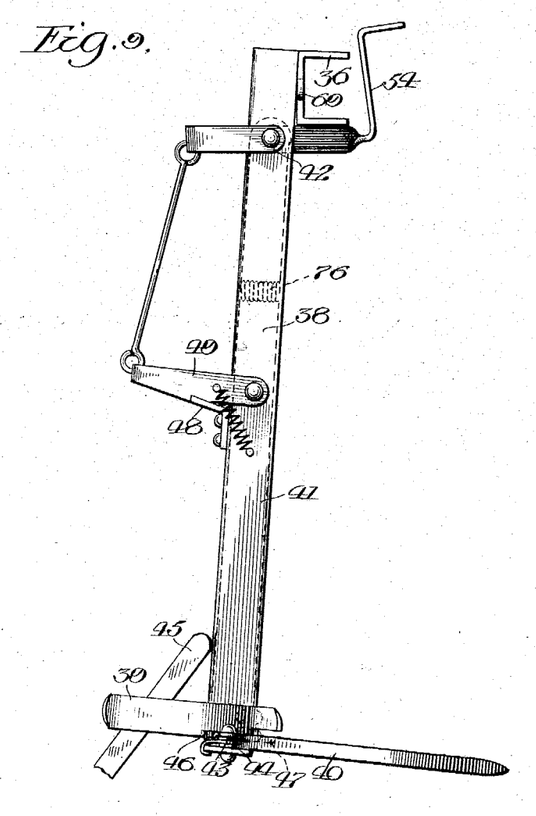

The lever 45, as before mentioned, is pivoted at 47, and by means of a connecting rod 75, is attached to the shaft 38, so that whenever a bundle has been deposited within a carrier, said lever 45 presses against the arm 41, and brings it into the position shown in Fig. 9 and Fig. 6, to securely hold the bundle.

Figure 8:
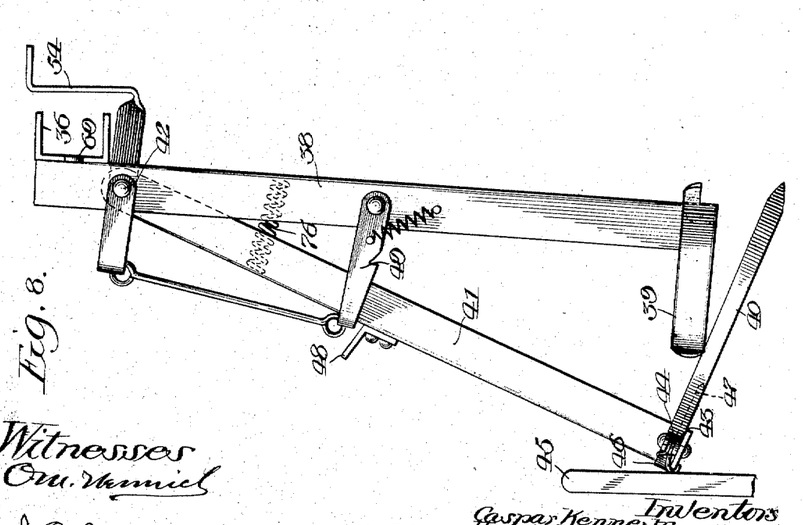

A spring 76 is shown, which spreads the arms 38 and 41, and brings them into position, as shown in Fig. 8, when the arm 49 is released from the detent 48.

It will be understood from this that a bundle, taken upon the cradle 32, is grasped by the first outwardly swung carrier 37, and the next carrier is released by the arm 62 into position to receive its bundle, and the next two carriers, which have been in an elevated position, are depressed into normal position by the arm 53 and likewise released when engaged by the arm 62, and the rest of the carriers which are all in a normal position are released when engaged by the arm 62, and thus the operation of the machine continues until every carrier has a bundle and all the carriers have been turned inwardly through the agency of the bars 67, all being in position as shown in Fig. 1, at which time one of the carriers, by means of the extension 29, acting upon the crank arm 28, breaks the links 4, 4, into the position shown in Fig. 1, so that the entire framework may drop, supported merely by the spring 5, at which time the disk 23, through the agency of its pins 50, opens all of the carriers to release their connections with bundles, and at the same time causes two of the carriers 37 to come into an elevated position, and one carrier 37 to swing in position to receive the first bundle at which time the weight of the shock having been removed, the spring 5 again raises the entire framework upwardly until the levers 4, 4, lock, whereupon, the machine can proceed in a forwardly direction to perform another cycle of operation.

Figure 3:
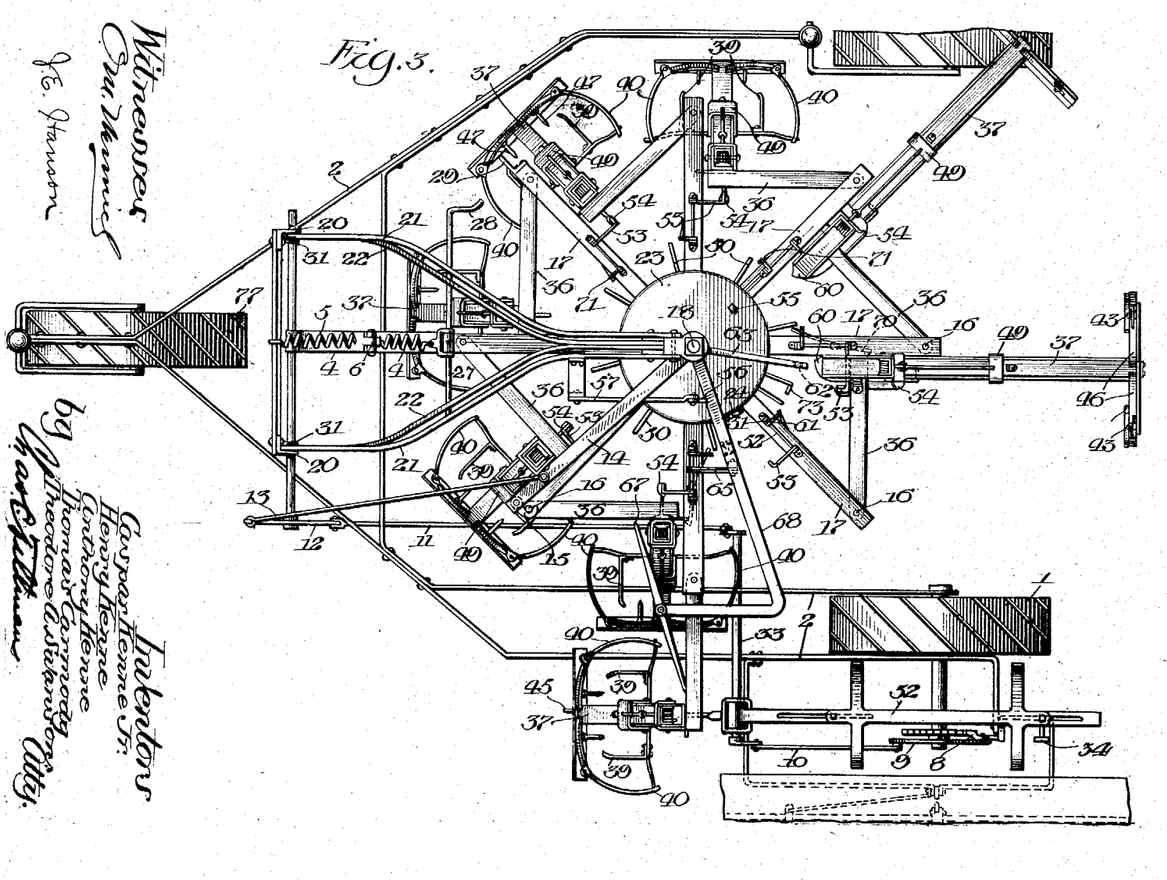
Fig. 3 is a plan view of the machine.

While in most of the figures no forward support has been shown, a wheel 77 is provided, as shown in Fig. 3, to support the forward end of said machine.

While herein is described the preferred embodiment of this invention, it is not desired to limit the scope of the invention to the exact construction and arrangement as herein set forth, but

Having thus described this invention, what is claimed as new and desired to be secured by Letters Patent is:

1. In a machine of the class described, the combination with a plurality of jointed arms adapted to receive bundles of grain, means for moving said arm consecutively to engage a bundle, grasping devices provided upon said arms, locking devices for locking said grasping devices, and means for actuating said arms to simultaneously deposit said bundles.

2. In a machine of the class described, the combination with a plurality of arms adapted to receive bundles of grain, means for moving said arms consecutively to engage a bundle, of means whereby said arms grasp said bundles upon engagement therewith, and means for actuating said arms to simultaneonsly deposit said bundles.

3. In a machine of the class described, the combination with a plurality of arms adapted to receive bundles of grain, of means for moving said arms consecutively to engage a bundle, means for actuating said arms to simultaneously deposit said bundles, and means for moving some of said arms out of the path of the deposited bundles.

4. In a machine of the class described, the combination with a plurality of arms adapted to receive bundles of grain, means for moving said arms consecutively to engage a bundle, of means whereby said arms grasp said bundles upon engagement therewith, means for actuating said arms to simultaneously deposit said bundles, and means for moving some of said arms out of the path of the deposited bundles.

5. In a machine of the class described, the combination with a plurality of arms adapted to receive bundles of grain, of means for moving said arms consecutively to engage a bundle, grasping devices for grasping said bundles, means for causing the simultaneous lowering of said arms to their bundle discharging position, and means for actuating said arms to simultaneously deposit said bundles.

6. In a machine of the class described, the combination with a plurality of arms adapted to receive bundles of grain, means for moving said arms consecutively to engage a bundle, of means whereby said arms grasp said bundles upon engagement therewith, means for causing simultaneous lowering of said arms, and means for actuating said arms to simultaneously deposit said bundles.

7. In a machine of the class described, the combination with a plurality of arms adapted to receive bundles of grain, of means for moving said arms consecutively to engage a bundle, means for causing the simultaneous lowering of said arms, means for actuating said arms to simultaneously deposit said bundles, and means for moving some of said arms out of the path of the deposited bundles.

8. In a machine of the class described, the combination with a plurality of arms adapted to receive bundles of grain, means for moving said arms consecutively to engage a bundle, of means whereby said arms grasp said bundles upon engagement therewith, means for causing the simultaneous lowering of said arms, means for actuating said arms to deposit said bundles, and means for moving some of said arms out of the path of the deposited bundles.

9. In a machine of the class described, the combination with a plurality of arms adapted to receive bundles of grain, of means for moving said arms consecutively to engage a bundle, grasping devices for holding said bundles, means for causing the simultaneous lowering of said arms, means for actuating said arms to simultaneously deposit said bundles, and means for automatically restoring said arms to their normal position.

10. In a machine of the class described, the combination with a plurality of arms adapted to receive bundles of grain, means for moving said arms consecutively to engage a bundle, of means whereby said arms grasp a bundle upon engagement therewith, means for causing the simultaneous lowering of said arms, means for actuating said arms to simultaneously deposit said bundles, and means for automatically restoring said arms to their normal position.

11. In a machine of the class described, the combination with a plurality of arms adapted to receive bundles of grain, of means for moving said arms consecutively to engage a bundle, means for causing the simultaneous lowering of said arms, means for actuating said arms to simultaneously deposit said bundles, and means for automatically restoring said arms to their normal position, said last-mentioned means comprising supporting arms and a spring.

12. In a machine of the class described, the combination with a plurality of arms adapted to receive bundles of grain, means for moving said arms consecutively to engage a bundle, of means whereby said arms grasp a bundle upon engagement therewith, means for causing simultaneous lowering of said arms, means for actuating said arms to simultaneously deposit said bundles, and means for automatically restoring said arms to their normal position said last mentioned means comprising supporting arms and a spring.

13. In a machine of the class described, the combination with a plurality of arms adapted to receive bundles of grain, of means for moving said arms consecutively to engage a bundle, means for causing the simultaneous lowering of said arms, said means including a projection provided upon one of said arms, means for actuating said arms to simultaneously deposit said bundles, and means for automatically restoring said arms to their normal position, said last-mentioned means comprising arms and a spring.

14. In a machine of the class described, the combination with a plurality of arms adapted to receive bundles of grain, means for moving said arms consecutively to engage a bundle, of means whereby said arms grasp a bundle upon engagement therewith, means for causing simultaneous lowering of said arms, said means including a projection provided upon one of said arms, means for actuating said arms to simultaneously deposit said bundles, and means for automatically restoring said arms to their normal position said last-mentioned means comprising supporting arms and a spring.

15. In a machine of the class described, the combination with a rotatable frame-work, means for periodically rotating said frame-work, a plurality of radially mounted arms extending from said frame-work, jointed supplemental arms mounted upon each of said first named arms, adapted to receive bundles, means for depositing a bundle upon each of the supplemental arms, means for moving each arm inwardly after it has received its bundle, locking devices mounted on said arms for locking said bundles and means for releasing said bundles of grain when each arm has been moved inwardly to deposit the bundles together to form a shock.

16. In a machine of the class described, the combination with a rotatable framework, means for periodically rotating said framework, a plurality of radially mounted arms extending from said framework, jointed supplemental arms mounted upon each of said first mentioned arms adapted to receive bundles, locking devices mounted upon each of the supplemental arms for locking said bundles, means for depositing a bundle upon each of the supplemental arms, means for moving each arm inwardly after it has received its bundle, means for lowering said framework when all of said arms have been moved inwardly, and means for releasing said bundles when said framework has been lowered to deposit said bundles together.

17. In a machine of the class described, the combination with a rotatable framework, means for periodically rotating said framework, a plurality of radially mounted arms extended from said framework, jointed supplemental arms mounted upon each of said first mentioned arms adapted to receive bundles, means for depositing a bundle upon each of the supplemental arms, locking devices mounted upon each of the supplemental arms for locking said bundles, means for moving each arm inwardly after it has received its bundle, means for locking each arm in its inward position, and means for releasing said first mentioned locking devices after each arm has been moved inwardly to deposit said bundles together.

18. In a machine of the class described, the combination with a rotatable framework, means for periodically rotating said framework, a plurality of radially mounted arms extending from said framework, jointed supplemental arms mounted upon each of said first mentioned arms adapted to receive bundles, means for depositing a bundle upon each of the supplemental arms, locking devices mounted upon each of the supplemental arms for locking said bundle, means for moving each arm inward after it has received its bundle, means for locking each arm in its inward position, means for lowering said framework when all of said arms have been moved inwardly, and means for releasing said first mentioned locking devices when each arm has been moved inwardly to deposit said bundles together.

19. In a machine of the class described, the combination with a rotatable framework, means for periodically rotating said framework, a plurality of radially mounted arms extended from said framework, jointed supplemental arms mounted upon each of said first mentioned arms adapted to receive bundles, means for depositing a bundle upon each supplemental arm, grasping devices for grasping a bundle, means for moving each supplemental arm inwardly after it has received its bundle, means for lowering said frame-work when all of said arms have been moved inwardly, and means operable when said framework is lowered for releasing said grasping devices to deposit said bundles together.

20. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for locking each arm in its inward position, means for lowering said framework when all of said arms have been moved inwardly, and means operable when said framework is lowered for releasing said grasping devices when each arm has been moved inwardly, to deposit said bundles together.

21. In a machine of the class described, the combination with a rotatable framework, means for periodically rotating said frame work, a plurality of radially mounted jointed arms extending from said framework, grasping devices provided upon said arms adapted to receive bundles, means for depositing a bundle upon each arm, means for moving each of said grasping devices inwardly after it has received its bundle, means for locking each arm in its inward position, means rigidly mounted upon said framework for periodically releasing said locking means, and means for releasing said grasping devices when each arm has moved inwardly, to deposit said bundles together.

22. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for locking each arm in its inward position, means rigidly mounted upon said framework for periodically releasing said locking means, means for lowering said framework when all of said arms have been moved inwardly, and means for releasing said grasping devices when said frame work has been lowered, to deposit said bundles together.

23. In a machine of the class described, the combination with a rotatable framework, means for periodically rotating said framework, a plurality of radially mounted jointed arms extending from said framework, grasping devices provided upon said arms adapted to receive bundles, an oscillating cradle for depositing a bundle upon each arm, means for moving each of said grasping devices inwardly after it has received its bundle, and means for releasing said grasping devices when each arm has been moved inwardly, to deposit said bundles together.

24. In a machine of the class described, the combination with a rotatable framework, a pitman for periodically rotating said framework, a plurality of radially mounted jointed arms extending from said frame work, grasping devices provided upon said arms adapted to receive bundles, means for depositing a bundle upon each arm, means for moving each of said grasping devices inwardly after it has received its bundle, and means for releasing said grasping devices when each arm has been moved inwardly, to deposit said bundles together.

25. In a machine of the class described, the combination with a rotatable framework, a pitman for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for lowering said framework when all of said arms have been moved inwardly, and means for releasing said grasping devices when said framework has been lowered, to deposit said bundles together.

26. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, a rotatably mounted lever for moving each of said grasping devices inwardly after it has received its bundle, and means for releasing said grasping devices when each arm has been moved inwardly, to deposit said bundles together.

27. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, a rotatably mounted lever for moving each of said grasping devices inwardly after it has received its bundle, means for lowering said framework when all of said arms have been moved inwardly, and means for releasing said grasping devices when said framework has been lowered, to deposit said bundles together.

28. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for lowering said framework when all of said arms have been moved inwardly, and a disk having radial extensions operable when said framework is lowered for releasing said grasping devices, to deposit said bundles together.

29. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for locking each arm in its inward position, means for lowering said framework when all of said arms have been moved inwardly, and a disk having radial extensions operable when said framework is lowered for releasing said grasping devices, to deposit said bundles together.

30. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for releasing said grasping devices when each arm has been moved inwardly, to deposit said bundles together, and means for raising a plurality of said arms to permit said machine to recede from said deposited bundles without disturbing same.

31. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for lowering said framework when all of said arms have been moved inwardly, means for releasing said grasping devices when said framework has been lowered, to deposit said bundles together, and means for raising a plurality of said arms to permit said machine to recede from said deposited bundles without disturbing the same.

32. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for releasing said grasping devices when each arm has been moved inwardly, to deposit said bundles together, means for raising a plurality of said arms to permit said machine to recede from said deposited bundles without disturbing same, means for lowering said arms when said arms again come into a receiving position, and locking means for holding them in said position.

33. In a machine of the class described, the combination with a rotatable framework, means for periodically rotating said framework, a plurality of radially mounted jointed arms extending from said framework, grasping devices provided upon said arms adapted to receive bundles, means for depositing a bundle upon each arm, means for moving each of said grasping devices inwardly after it has received its bundle, means for lowering said framework when all of the arms have been moved inwardly, means for releasing said grasping devices when said framework has been lowered, to deposit said bundles together, means for raising a plurality of said arms to permit said machine to recede from said deposited bundles without disturbing same, means for lowering said arms when said arms again come into a receiving position, and locking means for holding them in said position.

34. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, and means for periodically operating said devices to lock a bundle.

35. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, and means for periodically releasing said locking devices.

36. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, and automatic means for periodically lowering and raising said framework.

37. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, means for periodically releasing said locking devices, and automatic means for periodically lowering and raising said framework.

38. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, means for swinging said arms inwardly after they have received a bundle, and means for periodically releasing said locking devices.

39. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, means for swinging said arms inwardly after they have received a bundle, and automatic means for periodically lowering and raising said framework.

40. A machine of the class described comprising a rotatable framework having a plurality of bundle receiving arms, means for rotating said framework, grasping devices mounted upon said arms, a movable cradle for depositing a bundle against each arm, devices on each arm for locking a bundle in place, means for periodically operating said devices to lock a bundle, means for swinging said arms inwardly after they have received a bundle, means for periodically releasing said locking devices, and automatic means for periodically lowering and raising said framework.

CASPER KENNE, JR.
HENRY KENNE.
ANTHONY KENNE.
THOMAS CARMODY.
THEODORE A. SWANSON.

Witnesses:
MARK BOYLE,
THEO. ELBERT.

Copies of this patent may be obtained for five cents each, by addressing the "Commissioner of Patents, Washington, D. C."